United States Patent
Kummetz

(10) Patent No.: US 10,595,287 B2
(45) Date of Patent: *Mar. 17, 2020

(54) FREQUENCY-DIVISION DUPLEXING IN A TIME-DIVISION DUPLEXING MODE FOR A TELECOMMUNICATIONS SYSTEM

(71) Applicant: CommScope Technologies LLC, Hickory, NC (US)

(72) Inventor: Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,542

(22) Filed: Apr. 30, 2019

(65) Prior Publication Data

US 2019/0261292 A1 Aug. 22, 2019

Related U.S. Application Data

(63) Continuation of application No. 15/303,401, filed as application No. PCT/US2015/024740 on Apr. 7, 2015, now Pat. No. 10,292,119.

(Continued)

(51) Int. Cl.
*H04W 52/42* (2009.01)
*H04B 7/022* (2017.01)
(Continued)

(52) U.S. Cl.
CPC ............ *H04W 52/42* (2013.01); *H04B 7/022* (2013.01); *H04B 7/15535* (2013.01);
(Continued)

(58) Field of Classification Search
CPC ..... H04W 52/42; H04W 52/14; H04W 52/24; H04L 5/14; H04B 7/15542
See application file for complete search history.

(56) References Cited

U.S. PATENT DOCUMENTS 5,432,837 A 7/1995 Engelke et al.
5,751,708 A * 5/1998 Eng ..................... H04L 12/2801
370/310.1

(Continued)

FOREIGN PATENT DOCUMENTS

WO 2007123733 A2 11/2007
WO 2010002100 A2 1/2010

OTHER PUBLICATIONS

European Patent Office, "Extended European Search Report from EP Application No. 15776308.7 dated Nov. 7, 2017", from Foreign Counterpart to U.S. Appl. No. 15/303,401, dated Nov. 7, 2017, pp. 1-13, Published: EP.

(Continued)

*Primary Examiner* — Wei Zhao
(74) *Attorney, Agent, or Firm* — Fogg & Powers LLC

(57) ABSTRACT

Certain features relate to operating a distributed antenna system or repeater system communicating frequency-division duplexing ("FDD") signals in a time-division duplexing ("TDD") mode. A TDD mode scheduler is configured for monitoring a downlink communications channel for the start of a downlink frame, sub-frame, or resource slot. Based on the start of a downlink frame, sub-frame, or resource slot, the TDD mode scheduler can identify a TDD transmission time-slot. The TDD mode scheduler can schedule high-powered downlink sub-frames during the TDD transmission time-slots where higher power output may be desirable. Based on the indication of the TDD transmission time-slot, a transmit/receive controller can increase the gain of the downlink communication and reduce the gain of the uplink communication.

20 Claims, 6 Drawing Sheets

Related U.S. Application Data

(60) Provisional application No. 61/978,299, filed on Apr. 11, 2014.

(51) Int. Cl.
| | | |
|---|---|---|
| *H04B 7/155* | (2006.01) | |
| *H04L 5/14* | (2006.01) | |
| *H04W 52/14* | (2009.01) | |
| *H04W 52/24* | (2009.01) | |
| *H04W 72/12* | (2009.01) | |
| *H04W 88/08* | (2009.01) | |

(52) U.S. Cl.
CPC ..... *H04B 7/15542* (2013.01); *H04B 7/15578* (2013.01); *H04L 5/14* (2013.01); *H04W 52/143* (2013.01); *H04W 52/146* (2013.01); *H04W 52/243* (2013.01); *H04W 72/1263* (2013.01); *H04W 88/085* (2013.01)

(56) References Cited

U.S. PATENT DOCUMENTS

| | | | |
|---|---|---|---|
| 2007/0268846 A1* | 11/2007 | Proctor, Jr. | ........ H04B 7/15535 370/279 |
| 2009/0180407 A1 | 7/2009 | Sabat et al. | |
| 2009/0285147 A1 | 11/2009 | Subasic et al. | |
| 2009/0313376 A1* | 12/2009 | Cedervall | ........... H04L 65/1016 709/227 |
| 2010/0285737 A1 | 11/2010 | Gore et al. | |
| 2011/0292843 A1 | 12/2011 | Gan et al. | |
| 2013/0107763 A1 | 5/2013 | Uyehara et al. | |
| 2013/0188959 A1 | 7/2013 | Cune et al. | |
| 2013/0308537 A1 | 11/2013 | Kummetz et al. | |
| 2014/0024402 A1 | 1/2014 | Singh | |
| 2014/0341144 A1 | 11/2014 | Zhang et al. | |
| 2017/0041887 A1 | 2/2017 | Kummetz | |

OTHER PUBLICATIONS

International Searching Authority, "International Search Report and Written Opinion from PCT Application No. PCT/US2015/024740 dated Jun. 25, 2015", from Foreign Counterpart to U.S. Appl. No. 15/303,401, dated Jun. 25, 2015, pp. 1-9, Published: WO.

IP Australia, "Examination Report No. 1 from AU Application No. 2015244008 dated Jun. 28, 2018," from Foreign counterpart of U.S. Appl. No. 15/303,431; pp. 1-4; Published in AU.

U.S. Patent and Trademark Office, "Final Office Action", U.S. Appl. No. 15/303,401, dated Sep. 24, 2018, pp. 1-21, Published: US.

U.S. Patent and Trademark Office, "Notice of Allowance", U.S. Appl. No. 15/303,401, dated Dec. 31, 2018, pp. 1-9, Published: US.

U.S. Patent and Trademark Office, "Office Action", U.S. Appl. No. 15/303,401, dated Jun. 7, 2018, pp. 1-26, Published: US.

* cited by examiner

FREQUENCY-DIVISION DUPLEXING IN A TIME-DIVISION DUPLEXING MODE FOR A TELECOMMUNICATIONS SYSTEM

CROSS-REFERENCE TO RELATED APPLICATIONS

This application is a Continuation Application of U.S. patent application Ser. No. 15/303,401 filed Oct. 11, 2016, titled "FREQUENCY-DIVISION DUPLEXING IN A TIME-DIVISION DUPLEXING MODE FOR A TELE-COMMUNICATIONS SYSTEM", which was a U.S. National Stage Application of PCT Application Serial No. PCT/US2015/024740, filed Apr. 7, 2015, and titled "FREQUENCY-DIVISION DUPLEXING IN A TIME-DIVISION DUPLEXING MODE FOR A TELECOMMUNICATIONS SYSTEM", which claims the benefit of U.S. Provisional Application Ser. No. 61/978,299, filed Apr. 11, 2014 and titled "Frequency-Division Duplexing in a Time-Division Duplexing Mode for a Telecommunications System," the contents of each of which are incorporated herein by reference.

TECHNICAL FIELD

The present disclosure relates generally to telecommunications systems and more particularly (although not necessarily exclusively) to distributed antenna systems that can perform frequency-division duplexing communications in a time-division duplexing mode.

BACKGROUND

A distributed antenna system ("DAS") can include one or more head-end units and multiple remote units coupled to each head-end unit. A DAS can be used to extend wireless coverage in an area. Head-end units can be coupled to one or more base stations. A head-end unit can receive downlink signals from the base station and distribute downlink signals in analog or digital format to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base stations. Often, strong signals at the downlink path can interfere with incoming signals at the uplink path. It may be desirable to minimize the interference between downlink and uplink paths in a DAS.

Remote units can operate in a network that radiates frequency-division duplexing ("FDD") signals. In an FDD network, remote units and repeaters can use transmit/receive duplexers or filter stages to protect received signals in a receiving communications path from interference caused by signals other than the received signals. But, duplexers and filters do not allow for frequency agnostic, radio frequency front-ends unless significant limitations are introduced through transmit and receive antenna isolation.

SUMMARY

In one aspect, a distributed antenna system is provided. The distributed antenna system can include a head-end unit including a time-division duplexing ("TDD") mode scheduler. The TDD mode scheduler is configured to identify a start of a downlink radio block that includes frequency-division duplexing ("FDD") signals based on monitoring a downlink communications channel and generate an indication of a TDD transmission time-slot based on the start of the downlink radio block. The distributed antenna system can also include a remote unit configured to receive an uplink radio block that includes FDD signals on an uplink communications channel and transmit the downlink radio block on the downlink communications channel. The remote unit can also include a transmit/receive controller. The transmit/receive controller is configured to receive the indication of the TDD transmission time-slot. The transmit/receive controller is also configured to increase a downlink gain of the downlink radio block during the TDD transmission time-slot and reduce an uplink gain of the uplink radio block during the TDD transmission time-slot.

In another aspect, a unit of a repeater system is provided. The unit can include a transmitter configured to transmit a downlink radio block that includes downlink FDD signals on a downlink communications channel and a receiver configured to receive an uplink radio block that includes uplink FDD signals on an uplink communications channel. The unit can also include a TDD mode scheduler configured to identify a start of the downlink radio block based on monitoring a downlink communications channel and generate an indication of a TDD transmission time-slot based on the start of the downlink radio block. The unit can also include a transmit/receive controller configured to receive the indication of the TDD transmission time-slot, increase a downlink gain of the downlink radio block during the TDD transmission time-slot, and reduce an uplink gain of the uplink radio block during the TDD transmission time-slot.

According to another aspect, a method is provided. The method can include monitoring a downlink communications channel in which information formatted in radio blocks that include FDD signals is communicated. The method can further include identifying, based on the downlink communications channel, a start of a downlink radio block. The method can also include, based on the start of the downlink radio block, generating an indication of a TDD transmission time-slot. The method can also include increasing a downlink gain of the downlink radio block during the TDD transmission time-slot and reducing an uplink gain of an uplink radio block during the TDD transmission time-slot.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
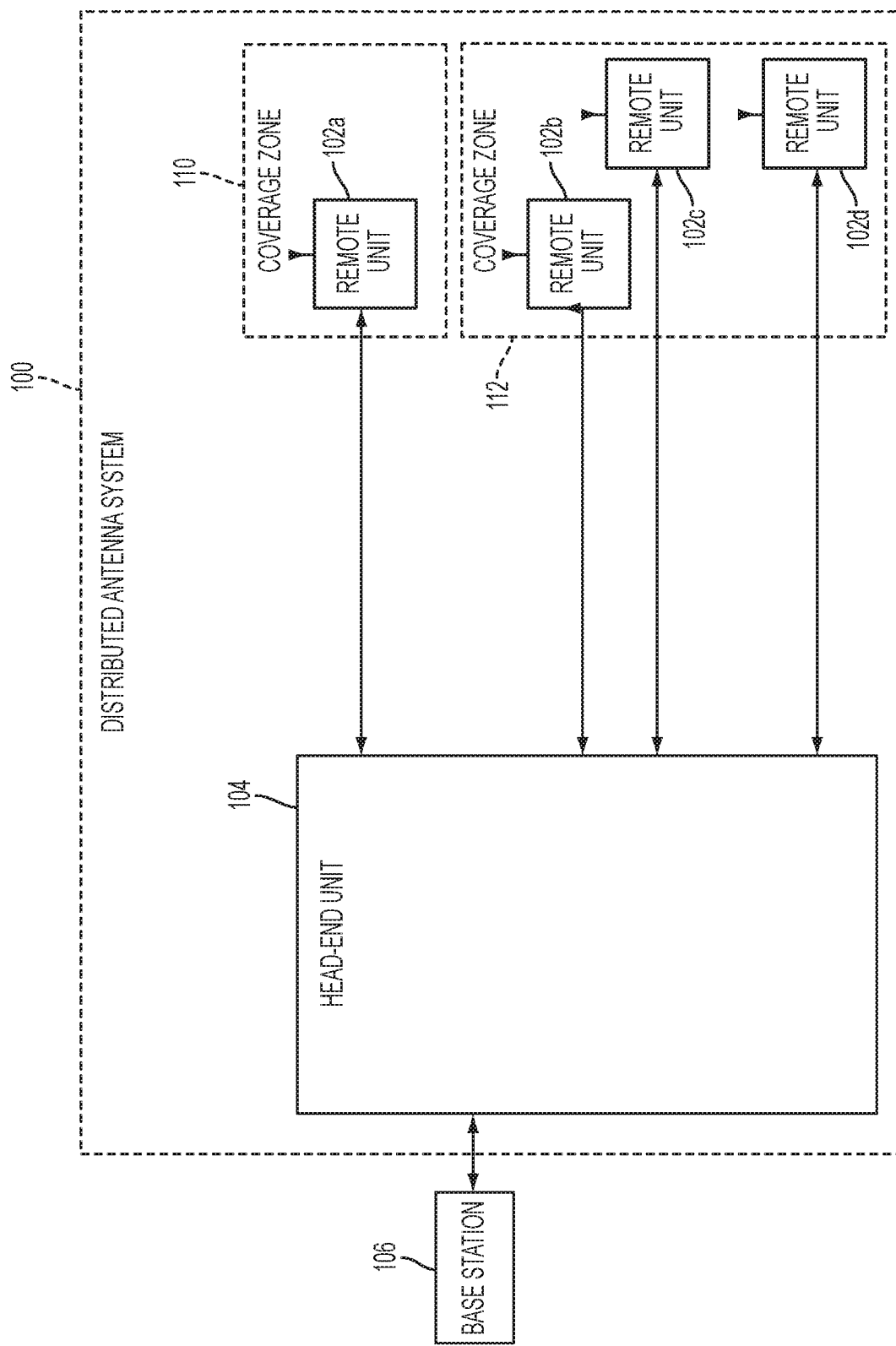
FIG. 1 is a block diagram depicting an example of a base station and a distributed antenna system ("DAS") suitable for performing frequency-division duplexing ("FDD") communications in a time-division duplexing ("TDD") mode according to one aspect of the present disclosure.

Certain aspects and features relate to transporting frequency-division duplexing ("FDD") signals or signal information in a time-division duplexing ("TDD") mode for a telecommunications system. For example, a head-end unit or a remote unit of a distributed antenna system ("DAS") can transport FDD signals in a TDD mode and can schedule higher power transmissions, increase power to the downlink signal during transmission time slots, and decrease uplink gain during transmission time slots to obtain desirable signal isolation. The reduction of the uplink receiver gain stages can be high enough to avoid uplink performance degradation due to receiver overdrive and interference from downlink signals coupling into the uplink receiver chain. Transporting FDD signals in a TDD mode can allow for a frequency agnostic front-end for a DAS in which remote units can transmit and receive network signals simultaneously in multiple frequency bands while minimizing the amount of hardware required.

According to one example, performing FDD in a TDD mode can be implemented using a TDD mode scheduler and a transmit/receive ("TX/RX") controller. The TDD mode scheduler can be located, for example, at a remote unit in a DAS. The TDD mode scheduler can identify transmit frames or transmit sub-frames in a communications channel (e.g., the frames and sub-frames pertaining to downlink activity). The TDD mode scheduler can schedule high-power downlink sub-frames by informing a TX/RX controller of the TDD transmission time-slots. The TX/RX controller can also be located, for example, at a remote unit in the DAS. The TX/RX controller can receive indications of the TDD transmission time-slots, and, in response, increase power to the high-power downlink sub-frames and reduce the downlink signal power when incoming uplink sub-frames are scheduled from distant mobiles. Reducing the uplink receiver chain gain for uplink sub-frames can further minimize interference caused by increasing the power to the downlink sub-frames. When the uplink receiver chain gain is reduced it is still possible to receive the uplink transmissions of mobiles that are located close to the remote unit or of mobiles that are transmitting at high RF power.

According to certain aspects, performing FDD communications in a TDD mode can protect the receivers in remote units from being overdriven by strong transmit signals while minimizing the amount of hardware used for protection. For example, certain aspects and features can help eliminate extra hardware, such as filter-based duplexers that are configured for fixed frequency bands, reducing the overall complexity of the system.

Additionally, certain aspects and features can help avoid limitations in isolation levels between transmitter and receiver antennas caused by environmental conditions. For example, environments with high scattering, such as in-building areas, can degrade antenna isolation levels and further limit radio frequency ("RF") transmit power to undesirable values (e.g., below 20 dB). Transporting FDD signals in a TDD mode can allow for a frequency agnostic front-end that can adapt to various environmental conditions dynamically. For example, according to one aspect of the present disclosure, the uplink front-end gain can be reduced by 1 dB or more (e.g., 10 dB or even switched off completely) when transmitting high-power downlink sub-frames. The amount of reduction in uplink front-end gain can vary depending on the isolation between the transmit path and receive path measured at a remote unit.

As new wireless communications standards are introduced or adopted, certain aspects and features of a frequency agnostic RF front-end operating in a TDD mode can provide advantages over fixed-filter solutions. A frequency agnostic front-end can allow for the transmit path and receive path of the DAS remote unit to be retuned for new or different frequency bands, as desired. As a result, a frequency agnostic front-end can minimize the number of remote unit variants associated with different wireless communications standards.

According to another aspect of the present disclosure, operating in the TDD mode allows for FDD-based devices in the DAS to continue to operate in FDD mode.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 depicts an example of a DAS 100 suitable for performing FDD in a TDD mode according to aspects and features of the subject matter described herein. The DAS 100 can include a network of spatially separated remote units 102a-d communicatively coupled to a head-end unit 104 for communicating with a base station 106 according to one aspect. For example, remote units 102a-d can connect directly to the head-end unit 104. In other aspects, the head-end unit 104 can be coupled to remote units 102a-d via a transport expansion unit or another intermediate device. The remote units 102a-d can provide wireless service to user equipment devices positioned in respective geographic coverage zones 110, 112.

The head-end unit 104 can receive uplink downlink signals from the base station 106 and transmit uplink signals to the base station 106. Any suitable communication link can be used for communication between base stations and head-end units, such as (but not limited to) a direct connection or a wireless connection. A direct connection can include, for example, a connection via a copper, optical fiber, or other suitable communication medium. In some aspects, the head-end unit 104 can include an external repeater or internal RF transceiver to communicate with the base station 106. In some aspects, the head-end unit 104 can combine downlink signals received from different base stations. The head-end unit 104 can transmit the combined downlink signals to one or more of the remote units 102a-d.

Remote unit 102a can provide signal coverage in a coverage zone 110 by transmitting downlink signals to mobile communication devices in the coverage zone 110 and receiving uplink signals from the user equipment in the coverage zone 110. In another aspect, multiple remote units 102b-d can provide signal coverage in a single coverage zone 112. The remote units 102a-d can transmit uplink signals to the head-end unit 104. The head-end unit 104 can combine uplink signals received from remote units 102a-d for transmission to the base station 106.

Figure 2:
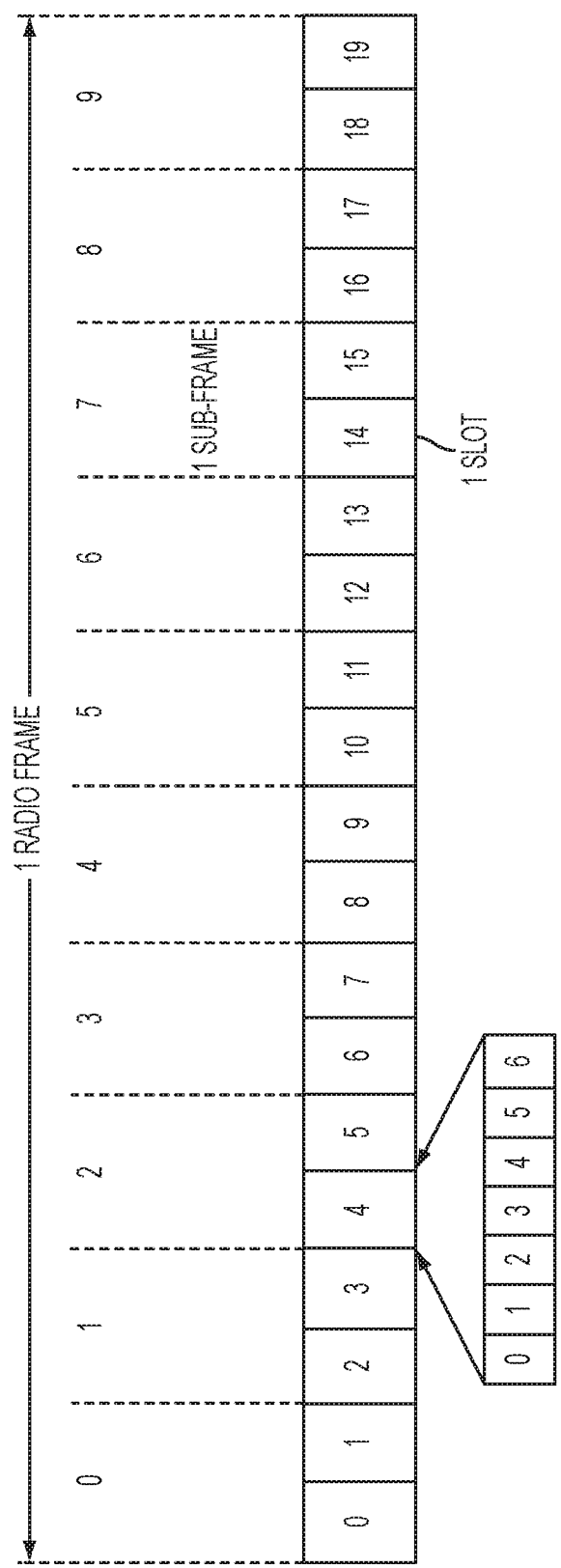
FIG. 2 depicts an example of a radio frame format suitable for radiating FDD mobile-network signals in a TDD mode according to one aspect of the present disclosure.

The information on the signals transmitted and received by remote units 102a-d and head-end unit 104 can be grouped in a radio frame format suitable for radiating FDD mobile network signals in a TDD mode. FIG. 2 depicts an example of a radio frame format according to certain aspects and features. While the radio frame format depicted in FIG. 2 includes an LTE (E-UTRA) type 1 frame structure, other radio frame formats can also be used. The radio frame includes twenty resource slots labeled 0-19. Resource slots can be grouped into pairs to create ten sub-frames labeled 0-9. For example, sub-frame 0 includes slots 0 and 1, sub-frame 1 includes slot 2 and 3, etc. Each resource slot or "block" can include seven symbols labeled symbols 0-7. Radio frame formats can contain various frame, sub-frame, and slot timing durations. In one example, a radio frame 10 ms in duration can consist of ten sub-frames 1.0 ms in duration each. Each sub-frame can contain two resource slots of duration 0.5 ms each.

FDD mobile network signals transmitted in a radio frame structure can be divided into uplink and downlink signals and grouped in radio frames, sub-frames, and resource slots in various configurations. For example, downlink network signals can be communicated in sub-frames 0, 2, 4, 6, and 8 and uplink network signals can be communicated in sub-frames 1, 3, 5, 7, and 9 in a radio frame that includes 10 sub-frames. In another example, downlink network signals and uplink mobile network signals can be communicated in alternate radio frames. The time duration of each downlink transmission can be referred to as a TDD transmission time-slot, which can correspond to the duration of the frame, sub-frame, or resource slot containing the downlink signal. For example, if downlink signals are communicated in sub-frames 0, 2, 4, 6, and 8 in a 10 ms radio frame, then the TDD transmission time-slots can be 0.5 ms in duration each.

Each TDD time-slot can correspond to a duration of time in which high powered downlink signals can be scheduled. In performing FDD communications in a TDD mode, remote units and head-end units can increase the power applied to transmit frames, sub-frames, or resource slots (hereinafter collectively referred to as "radio blocks") during TDD transmission time-slots. To reduce signal interference at the receiver, remote units and head-end units can reduce the gain of incoming, received radio blocks during TDD transmission time-slots.

Figure 3:
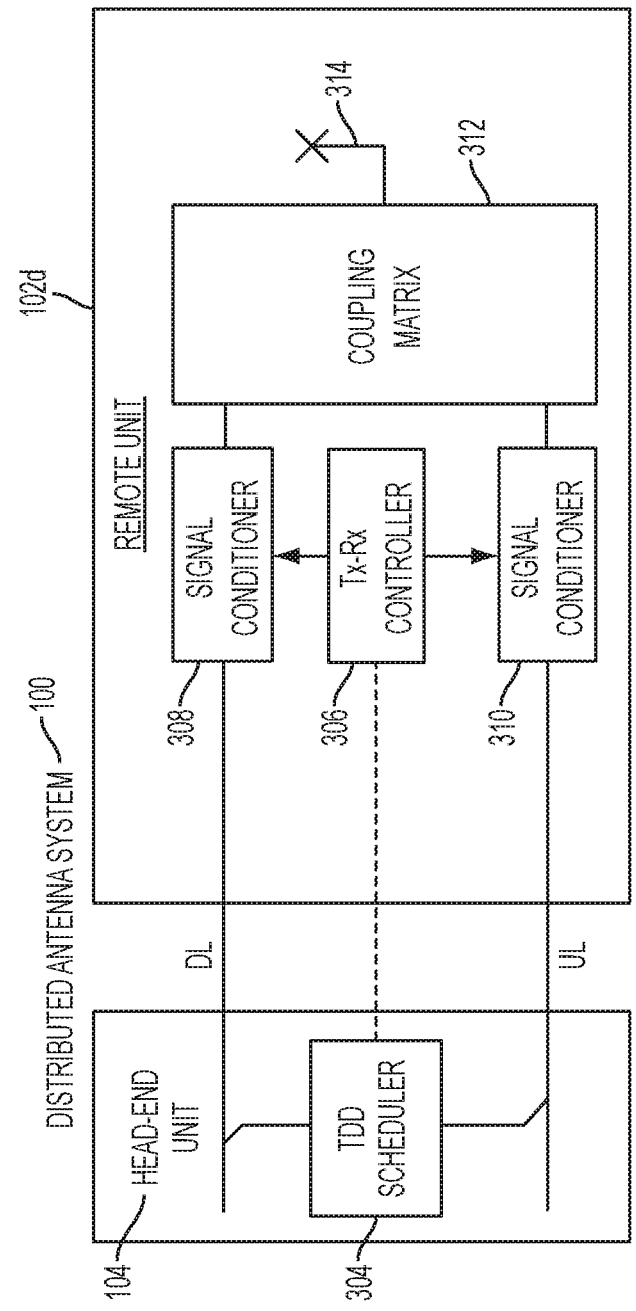
FIG. 3 is a block diagram showing an example of a remote unit of FIG. 2, configured for radiating FDD mobile-network signals in a TDD mode and having a shared transmit-receive antenna according to one aspect of the present disclosure.
Figure 4:
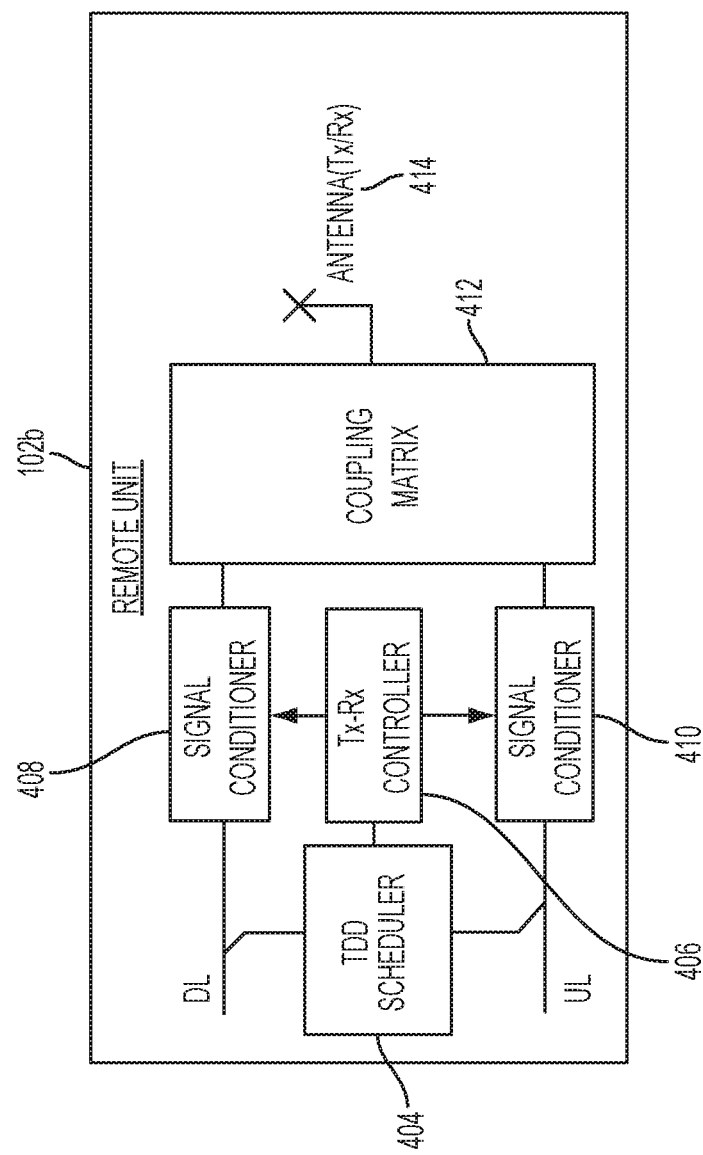
FIG. 4 is a block diagram showing an example of a remote unit of FIG. 2, configured for having separate transmit and receive antennas suitable for radiating FDD mobile-network signals in a TDD mode according to one aspect of the present disclosure.
Figure 5:
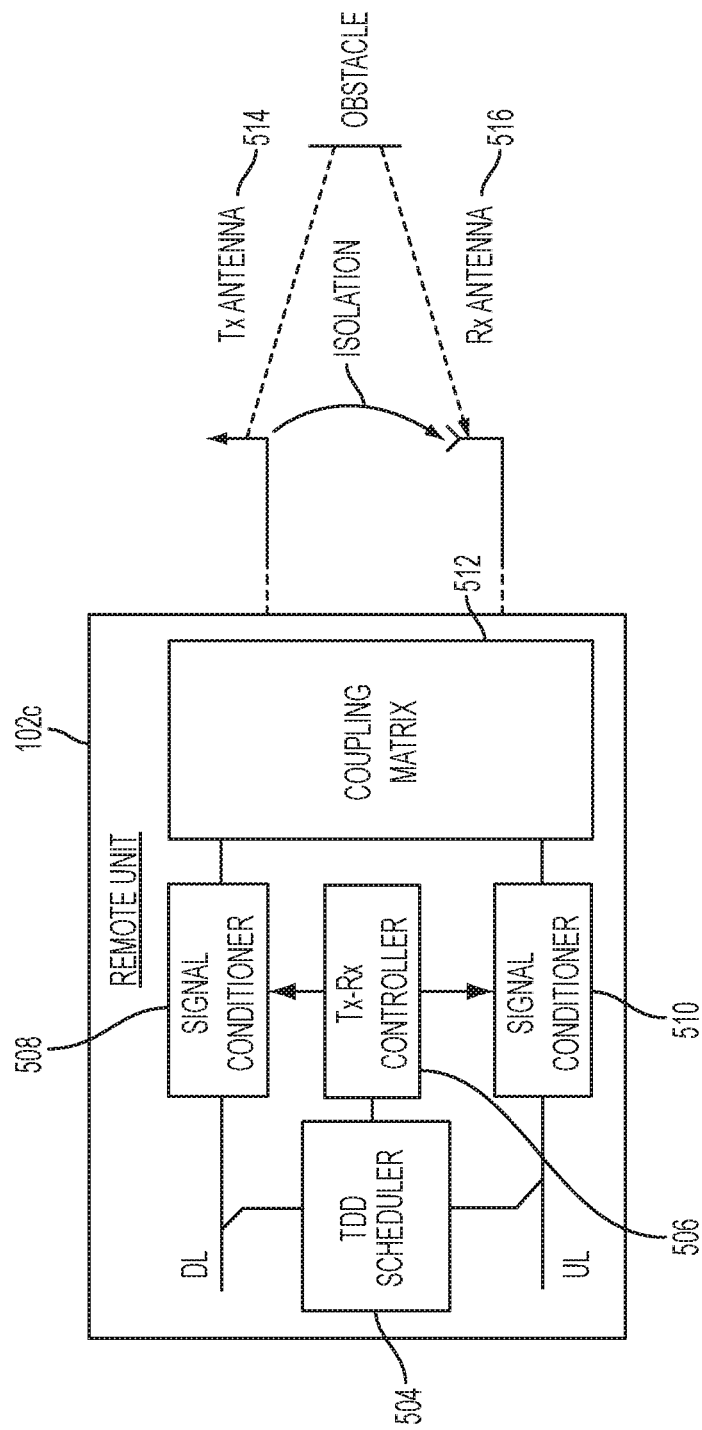
FIG. 5 is a block diagram showing an example of the DAS of FIG. 1 configured for radiating FDD mobile network signals in a TDD mode according to one aspect of the present disclosure.

Remote units 102a-d and head-end unit 104 in DAS 100 can monitor a downlink communications channel to identify the TDD transmission time-slots that correspond to a downlink radio block in order to operate in a TDD mode. Remote units 102a-d and head-end unit 104 can be configured in various ways in order to monitor radio frames and radiate FDD network signals in a TDD mode. FIGS. 3-5 depict examples of certain configurations.

FIG. 3 is an example of a schematic block diagram of a DAS 100 in which the head-end unit 104 is communicatively coupled to the remote unit 102d. The head-end unit 104 can transmit downlink signals to the remote unit 102d via a downlink signal path and can receive uplink signals from the remote unit 102d via an uplink signal path. Head-end unit 104 can include a TDD mode scheduler 304, which monitors a downlink communications channel for the start of a TDD transmission time-slot in a radio frame. The length of a frame can be determined by the format of the frame and may be known to TDD mode scheduler 304 that is monitoring a downlink communications channel. The TDD mode scheduler 304 can identify the start of a downlink radio block and use the start of the downlink radio block to identify a TDD transmission time-slot within the communications channel. The TDD mode scheduler 304 can generate an indication of the TDD transmission time-slot and communicate the indication to a TX/RX controller 306 located in the remote unit 102d.

The indication of the TDD transmission time-slot can include information specifying the start time and end time of the radio block that contains the downlink transmission. Alternatively, the indication can include information specifying the total duration of the radio block that contains the downlink transmission.

The remote unit 102d can include the TX/RX controller 306, signal conditioners 308, 310, and a coupling matrix 312 coupled to an antenna 314. The TX/RX controller 306 can detect incoming TDD transmission time-slots from the TDD mode scheduler 304 and increase the power applied to the downlink radio block. In order to minimize signal interference, the TX/RX controller 306 can also reduce the power of any incoming uplink radio blocks during the TDD transmission time-slot. In some aspects, the TX/RX controller 306 can increase and reduce the gain of radio blocks through the use of the signal conditions 308, 310. Increasing the transmit power level may include increasing the power envelope of the sub-frame rather than the power envelope of the actual resource blocks. According to another aspect of the present disclosure, the transmit power level can be increased on a per-slot basis. According to one further aspect of this invention the TX/RX controller 306 can also reduce the power of a downlink radio block during a time slot not marked as a TDD transmission.

Signal conditioner 310 can be located in the uplink path and signal conditioner 308 can be located in the downlink path. Each signal conditioner 308, 310 can be coupled to the TX/RX controller 306 and to the coupling matrix 312. Signal conditioners 308-310 can include attenuators, variable gain amplifiers, switches, relays, or other elements, such as multipliers or digital signal scalers, used in digital signal processing. The signal conditioner 308 can adjust the gain of the downlink resource block via a command from the TX/RX controller 306. Similarly, the signal conditioner 310 can adjust the gain of the uplink resource block via a command from the TX/RX controller 306. TX/RX controller 306 can be a controller or logic circuit that receives instructions from the TDD scheduler 304 and communicates with signal conditioners 308 and 310 via serial or parallel interfaces. The signal conditioners 308, 310 can communicate signals to and from the coupling matrix 312. The coupling matrix 312 can include a three-port device configured to combine the transmit path output (downlink), the receive path input (uplink) and the transmit/receive signals from the antenna 314. The coupling matrix 312 can include, for example, a circulator, combiner, isolator, or other suitable device for processing radio frequency signals.

According to one aspect of the present disclosure, the TDD mode scheduler 304 can be configured to schedule radio blocks for distant user devices in the time periods of the high-power downlink sub-frames. The DAS remote unit 102d and other remote units adjacent to head-end unit 104 can be scheduled to apply the high-power mode to different sub-frames to minimize interference. For example, if remote unit 102d is transmitting at a higher power, the TDD mode scheduler 304 can instruct a different, adjacent remote unit to adjust to operate at a lower power to minimize interference and maximize data throughput for mobiles that are located at similar distances from remote unit 102d and other adjacent remote units.

High-power downlink scheduling can be performed dynamically based on information received from a DAS remote unit, traffic conditions, or a distance distribution of the user devices served by the DAS. Scheduling of radio blocks can also be changed dynamically according to traffic needs. For example, mobile user devices located at an edge of a cell may use more high-power slots.

According to another aspect of the present disclosure, along with monitoring a downlink communications channel, the TDD mode scheduler 304 can be configured to monitor an uplink communications channel in order to detect uplink traffic and activity. For example, adjacent user equipment devices transmitting uplink signals on the same frequency band can cause interference and signal degradation. The TDD mode scheduler 304 can analyze the signal frequency spectrum used by user devices and use the detected uplink activity information to further optimize and assign high-power downlink sub-frames. The TX/RX controller 306 can adjust the transmit power level of the downlink sub-frames and uplink sub-frames during the times high-power downlink sub-frames are scheduled.

FIG. 4 is a block diagram showing another example configuration for a remote unit in DAS 100 suitable for radiating FDD mobile network signals in a TDD mode. Remote unit 102b can include a TDD mode scheduler 404 communicatively coupled with a TX/RX controller 406. Similar to the TDD mode scheduler 304, the TDD mode scheduler 404 in remote unit 102b can monitor a downlink communications channel for the start of a TDD transmission time-slot in a radio frame and communicate an indication of the TDD transmission time slot to the TX/RX controller 406.

The TX/RX controller 406 can be coupled to signal conditioners 408, 410. Signal conditioners 408, 410 can adjust the gains of downlink and uplink communications radio blocks according to commands from the TX/RX controller 406. Signal conditioners 408,410 can be communicatively coupled to a coupling matrix 412 coupled to a shared TX/RX antenna 414. The shared TX/RX antenna 414 is configured to both transmit and receive signals between the remote unit 102b and one or more user equipment devices.

FIG. 5 is an example of remote unit 102c having separate transmit and receive antennas 514, 516 suitable for radiating FDD mobile network signals in a TDD mode. Similar to the remote units 102b, 102d, the remote unit 102c can include a TDD mode scheduler 504 coupled to a TX/RX controller 506 coupled to signal conditioners 508, 510. The signal conditioners 508, 510 can be coupled to a coupling matrix 512. In contrast to the shared TX/RX antenna discussed above with respect to FIG. 4, the DAS remote unit 102c can include separate antennas for transmitting and receiving signals. The coupling matrix 512 can be coupled to the separate TX/RX antennas 514, 516. In some examples, circulators or couplers can be cascaded to improve the isolation between the receiving and transmitting antennas. In other aspects, however, the transmit antenna 514 can be coupled directly to the transmit path and the receive antenna 516 can be coupled directly to the receive path. By using separate antennas, isolation values 40 dB or more can be achieved. Cross-polarization of the two antennas 514, 516, spatial separation, or any nulling of the electro-magnetic field of the signal of the transmit antenna 514 at the position of the receive antenna 516 can improve the isolation level.

Additionally, when separate antennas 514, 516 are used at the remote unit 102c, transmit to receive isolation can be determined by measuring the isolation between transmit antenna 514 and the receive antenna 516 as a function of frequency. Measured isolation levels can be used to determine an uplink gain reduction that can further reduce signal degradation at the downlink communications path. The TX/RX controllers 506 can determine isolation levels by calculating the amount of power transmitted on the transmit path that is received on the receive path for each frequency.

By using the measured isolation levels, the amount of uplink front-end gain reduction can be determined by the following relationship:

Isolation_required=Isolation_measured $(f)-\Delta P\_tx(f)-\Delta\_G\_rx(f)$

Where:
Isolation_required is the isolation that the remote unit front-end needs for simultaneous operation of receive and transmit functions with no degradation of the receive path, with $\Delta P\_tx\ (f)=0$ and $\Delta G\_rx\ (f)=0$.
Isolation_measured (f) is the measured transmit to receive isolation depending on the frequency.
$\Delta P\_tx\ (f)$ is the change of transmit power within the high power downlink sub-frames compared to the nominal power. A $\Delta P\_tx\ (f)=+10$ dB represents an increase of the output power of 10 dB. The change in the transmit power can be achieved by changing the gain in the transmit path.
$\Delta G\_rx\ (f)$ is the change of DAS remote unit front-end gain compared to the nominal gain for regular downlink power. A $\Delta G\_rx\ (f)=-10$ dB represents a reduction of the front-end gain of the receiver by 10 dB.

According to a further aspect of this invention the systems depicted in FIG. 4 and FIG. 5 are not necessarily limited to a remote unit in a DAS system but can represent the part of a repeater system providing coverage where the repeater system uses an over the air link to the base station.

Figure 6:
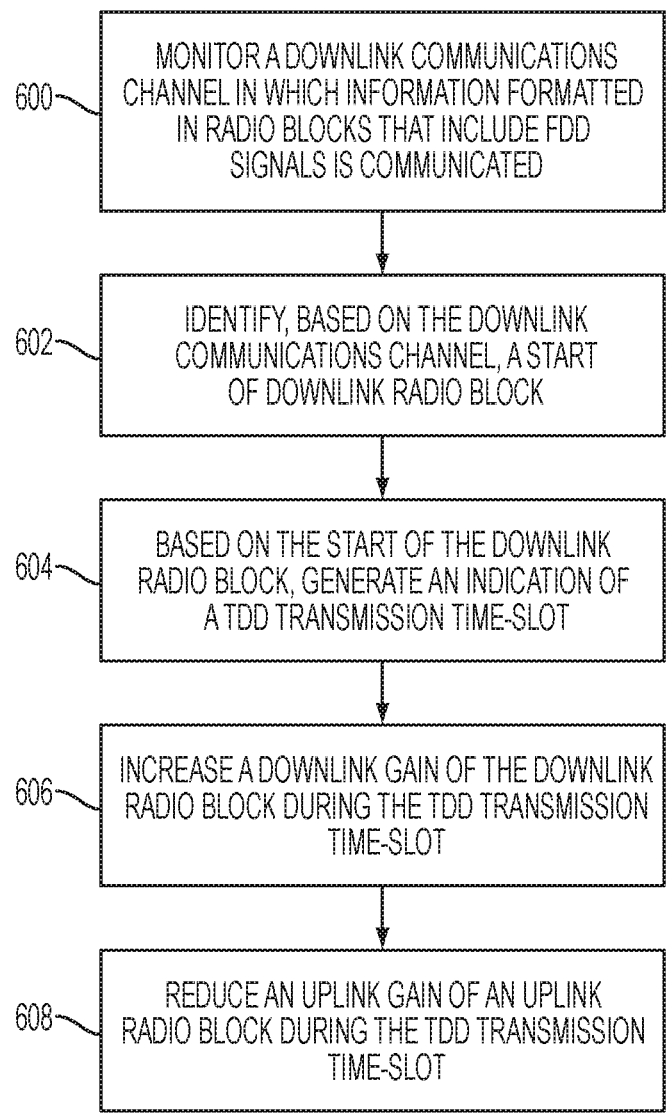
FIG. 6 is a flow chart depicting an example of a process for using a DAS configured for FDD communications in a TDD mode.

FIG. 6 is a flow chart depicting an example of a process for using a DAS in a TDD mode for an FDD mobile network system according to an aspect of the present disclosure.

In block 600, a component in a DAS, such as a head-end unit or a remote unit, can monitor a downlink communications channel in which information formatted in radio blocks is communicated. For example, remote units 102a-d or head-end unit 104 can include a TDD mode scheduler, such as one of the TDD mode schedulers 304, 404, 504, that can monitor the downlink communications channel. Various configurations for monitoring the downlink communications channel are possible. For example, the TDD mode scheduler can be communicatively coupled to the downlink communications link from the head-end unit such that information sent on the downlink communications link is also input into a network interface on the TDD mode scheduler. Alternatively, signals on the downlink communications channel can be input into a processor, such as a field programmable gate array or a dedicated baseband processor in the TDD mode scheduler. The TDD mode scheduler can continually process the downlink communication signal via a network interface or processor to analyze the type of information on the path (e.g., whether the information is a transmission frame, sub-frame, or resource slot).

In block 602, based on the downlink communications channel, a start of a downlink radio block is identified. For example, one of the TDD mode schedulers 304, 404, 504 can identify the start of the downlink radio block by processing the information on the downlink channel and searching for an identifier or reference data in the information that characterizes the radio block as a downlink radio block or an uplink radio block. Alternatively, the TDD mode scheduler can process information on the downlink communications path to search for control information that can specify scheduling assignments for downlink radio blocks and uplink radio blocks. The TDD mode scheduler can utilize the scheduling assignment control information to identify the start of a downlink radio block detected in a subsequent communication in the downlink path. Other forms of identifying the start of the downlink radio block are also possible.

In block 604, based on the start of the downlink radio block, an indication of a TDD transmission time-slot is generated. For example, one of the TDD mode schedulers 304, 404, 504 can generate an indication of a TDD transmission time slot. In one aspect, the length of the downlink radio block may be known by the TDD mode scheduler. Upon receiving the start of the downlink radio block, a processor in the TDD mode scheduler can calculate the duration for the downlink radio block. The TDD mode schedule can subsequently generate an indication via a signal including information specifying the duration information of the TDD transmission time-slot. In another aspect, the TDD mode scheduler can generate an indication via a signal including detailed information pertaining to the downlink radio block. For example, in the indication, the TDD mode scheduler can specify the total duration of the radio frame, the start time of the downlink radio block, and the end time of the downlink radio block. The TDD mode scheduler can also generate an indication of a TDD transmission time-slot in any other form that communicates the location and duration of the downlink radio block within the radio frame. The indication can include a digital signal including a binary string of 1s and 0s. Alternatively, the indication can include a radio frequency carrier wave containing analog information associated with the TDD transmission time-slot.

In block 606, a downlink gain of the downlink radio block is increased during the TDD transmission time-slot. For example, the remote units 102a-d can include TX/RX controllers 306, 406, 506 that can increase the gain of the downlink resource block. In one example, the TX/RX controllers can send commands to signal conditioners that perform digital signal processing on the downlink radio blocks to increase the power envelope of the sub-frames in the downlink radio blocks. In another example, TX/RX controllers can send commands to adjust the gains on a per-slot basis. In a further aspect, TX/RX controllers can directly perform digital signal processing on the downlink radio block to increase the gain.

In block 608, an uplink gain of an uplink gain is reduced during the TDD transmission time-slot. For example, TX/RX controllers can reduce the gain of the uplink radio blocks by sending commands to coupled signal conditioners to perform digital signal processing on the uplink radio blocks. Similar to the downlink radio blocks, the signal conditioners can reduce the gain of the uplink radio blocks by reducing the power envelope of the sub-frames in the uplink radio blocks or adjust the gains on a per-slot basis. By reducing the gain of the uplink radio blocks during a TDD transmission time-slot, the process can protect the uplink communications path from being overdriven by the strong transmit signals being sent on the downlink communications path.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. An antenna system for communicating information formatted in radio blocks, the antenna system comprising:
   a time-division duplexing ("TDD") mode scheduler, the TDD mode scheduler configured to identify a start of a downlink radio block and generate an indication of a TDD transmission time-slot based on detection of the start of the downlink radio block;
   a transmit/receive controller configured to receive the indication of the TDD transmission time-slot and in response to the indication:
      increase a downlink gain of the downlink radio block during the TDD transmission time-slot; and
      reduce an uplink gain of an uplink radio block during the TDD transmission time-slot.

2. The antenna system of claim 1, wherein the indication of the TDD transmission time-slot communicates a location and a duration of the downlink radio block within a radio frame.

3. The antenna system of claim 2, wherein the indication of the TDD transmission time-slot specifies at least one of: a total duration of the radio frame, a start time of the downlink radio block, and an end time of the downlink radio block.

4. The antenna system of claim 1, wherein the TDD mode scheduler processes information on a downlink communications path of the antenna system to search for control information that specifies scheduling assignments for downlink radio blocks and uplink radio blocks.

5. The antenna system of claim 4, wherein the TDD mode scheduler processes the scheduling assignment control information to identify a start of the downlink radio block as detected in a subsequent communication in the downlink communications path.

6. The antenna system of claim 1, wherein the TDD mode scheduler is further configured to generate an indication of uplink activity by monitoring an uplink path of the antenna system; and
   wherein the transmit/receive controller is further configured to receive the indication of uplink activity, increase the downlink gain of the downlink radio block based on the indication of uplink activity, and reduce the uplink gain of the uplink radio block based on the indication of uplink activity.

7. The antenna system of claim 1, wherein the transmit/receive controller is configured to increase the downlink gain by increasing a power envelope of a transmit sub-frame.

8. The antenna system of claim 1, wherein the transmit/receive controller is configured to increase the downlink gain by increasing gains of resource slots included in the downlink radio block.

9. The antenna system of claim 1, wherein the antenna system further comprises:
   a head-end unit; and
   at least one remote antenna unit coupled to the head-end unit.

10. The antenna system of claim 9, wherein the remote antenna unit further comprises a transmit antenna and a receive antenna, wherein the transmit antenna and the receive antenna are physically separated from each other.

11. The antenna system of claim 1, wherein the transmit/receive controller is further configured to determine an isolation measurement between an uplink communications channel and a downlink communications channel, determine an amount of uplink gain reduction based on the isolation measurement, and reduce a gain of the uplink communications channel based on the amount of uplink gain reduction.

12. The antenna system of claim 11, wherein the transmit/receive controller is configured to determine the isolation measurement between the uplink communications channel and the downlink communications channel by calculating an amount of power transmitted on the downlink communications channel that is received on the uplink communications channel.

13. The antenna system of claim 1, further comprising
a transmitter configured to transmit the downlink radio block, wherein the downlink radio block includes downlink frequency-division duplexing signals on a downlink communications channel; and
a receiver configured to receive an uplink radio block that includes uplink frequency-division duplexing signals on an uplink communications channel.

14. The antenna system of claim 13, wherein a shared transmit/receive antenna is coupled to the transmitter and the receiver.

15. A method for an antenna system used to communicate information formatted in radio blocks, the method comprising:
in a downlink path of the antenna system, detecting a start of a downlink radio block;
outputting to a transmit/receive controller an indication of a time-division duplexing ("TDD") transmission time-slot in response to detecting the start of the downlink radio block; and
at a transmit/receive controller, in response to receiving the indication of the TDD transmission time-slot:
increasing a downlink gain of the downlink radio block during the TDD transmission time-slot; and
reducing an uplink gain of an uplink radio block during the TDD transmission time-slot.

16. The method of claim 15, wherein, at the transmit/receive controller, in response to receiving the indication of the TDD transmission time-slot, increasing the downlink gain of the downlink radio block during the TDD transmission time-slot comprises increasing a power envelope of a transmit sub-frame.

17. The method of claim 15, wherein at the transmit/receive controller, in response to receiving the indication of the TDD transmission time-slot, increasing the downlink gain of the downlink radio block during the TDD transmission time-slot comprises increasing a gain of resource slots included in the downlink radio block.

18. The method of claim 15, wherein the indication of the TDD transmission time-slot communicates a location and a duration of the downlink radio block within a radio frame.

19. The method of claim 15, wherein the indication of the TDD transmission time-slot specifies at least one of: a total duration of the radio frame, a start time of the downlink radio block, and an end time of the downlink radio block.

20. The method of claim 15, further comprising:
processing information on a downlink communications path of the antenna system to search for control information that specifies scheduling assignments for downlink radio blocks and uplink radio blocks to identify a start of the downlink radio block as detected in a subsequent communication in the downlink path.

* * * * *